(12) United States Patent
Collins et al.

(10) Patent No.: US 11,731,777 B2
(45) Date of Patent: Aug. 22, 2023

(54) CONTROL CIRCUIT FOR A POWER DISTRIBUTION NODE

(71) Applicant: GE Aviation Systems Limited, Cheltenham (GB)

(72) Inventors: John Oliver Collins, Cheltenham (GB); David Alan Elliott, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 17/400,866

(22) Filed: Aug. 12, 2021

(65) Prior Publication Data

US 2022/0063827 A1   Mar. 3, 2022

(30) Foreign Application Priority Data

Aug. 25, 2020 (GB) ..................... 2013257

(51) Int. Cl.

| | | |
|---|---|---|
| *B64D 33/00* | (2006.01) | |
| *H02J 9/06* | (2006.01) | |
| *B64D 41/00* | (2006.01) | |
| *G06F 1/3206* | (2019.01) | |
| *H02H 1/00* | (2006.01) | |
| *H02H 9/02* | (2006.01) | |

(52) U.S. Cl.
CPC ............ *B64D 33/00* (2013.01); *B64D 41/00* (2013.01); *G06F 1/3206* (2013.01); *H02H 1/0007* (2013.01); *H02H 9/02* (2013.01); *H02J 9/061* (2013.01); *B64D 2221/00* (2013.01); *H02J 2310/44* (2020.01)

(58) Field of Classification Search
CPC .......... H02J 2310/44; H02J 4/00; H02J 3/007; B64D 2221/00; B64D 41/00; H02H 9/02; H02H 1/0007; G06F 1/3203; G06F 1/3206

See application file for complete search history.

(56) References Cited

U.S. PATENT DOCUMENTS

| | | | |
|---|---|---|---|
| 9,240,685 B2 | 1/2016 | Rozman et al. | |
| 9,325,170 B2 | 4/2016 | Rozman et al. | |
| 10,409,744 B1* | 9/2019 | Gross | ..................... G06F 1/3287 |
| 2005/0023898 A1 | 2/2005 | Eckert et al. | |
| 2009/0021189 A1 | 1/2009 | DuBose et al. | |
| 2010/0115317 A1 | 5/2010 | Aurich et al. | |
| 2016/0013654 A1 | 1/2016 | Saha | |
| 2017/0110874 A1* | 4/2017 | van Dijk | .................. H02H 3/08 |
| 2018/0167066 A1 | 6/2018 | Elliott | |
| 2018/0205220 A1 | 7/2018 | Elliott | |
| 2018/0222334 A1 | 8/2018 | Compton et al. | |
| 2018/0375505 A1* | 12/2018 | Handy | ...................... H02J 1/14 |

(Continued)

FOREIGN PATENT DOCUMENTS

| | | |
|---|---|---|
| DE | 10250616 C1 | 11/2003 |
| EP | 3553908 A1 | 10/2019 |
| EP | 3553909 A1 | 10/2019 |

*Primary Examiner* — Ryan Johnson (74) *Attorney, Agent, or Firm* — McGarry Bair PC (57) ABSTRACT

A power distribution node, includes a power switch controllably operable to supply energy from an input to an output when the power switch is closed and to not supply energy from the input to the output when the power switch is open, a controller module, a supply power source connected with and energizing the controller module, and a control circuit configured to sense a power characteristic of the power distribution node.

19 Claims, 4 Drawing Sheets

(56) References Cited

U.S. PATENT DOCUMENTS

| | | |
|---|---|---|
| 2019/0011942 A1 | 1/2019 | Hsieh et al. |
| 2019/0163248 A1* | 5/2019 | Handy .................... G06F 1/266 |
| 2020/0149504 A1* | 5/2020 | Vutetakis ............ F02N 11/0862 |
| 2022/0060011 A1* | 2/2022 | Yousef .................... H02H 3/08 |

\* cited by examiner

CONTROL CIRCUIT FOR A POWER DISTRIBUTION NODE

CROSS REFERENCE TO RELATED APPLICATION(S)

This application claims priority to and benefit of GB Patent Application No. 20132577 filed Aug. 25, 2020, which is incorporated herein in its entirety.

TECHNICAL FIELD

The disclosure relates to a method and apparatus for operating a power distribution node in a low power consumption mode.

BACKGROUND

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads. Power distribution nodes can, for instance, further provide switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION

In one aspect, the present disclosure relates to a method of operating a power switch in a power distribution node controllably operated by a controller module, the method including, while a latch component has latched a control output to the power switch, operably enter a low power consumption mode for the controller module, receive, by the controller module in the low power consumption mode, a power characteristic of the power distribution node, compare the power characteristic with a threshold power characteristic value, and upon satisfying the comparison, operably enter a normal power consumption mode for the controller module, the normal power consumption mode consuming more power compared with the low power consumption mode, determine a desired power switch operating condition, by the controller module in the normal power consumption mode, in response to the power characteristic, and effect the determined desired power switch operating condition by way of controllably instructing the latch component to latch the control output in accordance with the determined desired power switch operating condition, and operably re-enter the low power consumption mode for the controller module.

In another aspect, the present disclosure relates to a power distribution node, including a power switch controllably operable to supply energy from an input to an output when the power switch is closed and to not supply energy from the input to the output when the power switch is open, a latch component controllably operable to latch a binary control output connected with the power switch, and operable to controllably close and open the power switch, a controller module adapted to operate in a normal power consumption mode and a low power consumption mode, the normal power consumption mode consuming more power than the low power consumption mode, and configured to controllably operate the latch component to latch the binary control output in the normal power consumption mode, a limited supply power source connected with and energizing the controller module, and a control circuit configured to sense a power characteristic of the power distribution node, and upon satisfying a comparison of the power characteristic with a power characteristic threshold, instruct the controller module to enter the normal power consumption mode from the low power consumption mode. When in a normal power consumption mode, the controller module is further configured to re-enter the low power consumption mode after controllably operating the latch component to latch the binary control output.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

The described aspects of the present disclosure are directed to an electrical power distribution system or power distribution node for an aircraft, which enables production and distribution of electrical power from a turbine engine, such as a gas turbine engine driven generator, to the electrical loads of the aircraft. It will be understood that while aspects of the disclosure are shown in or intended for in-situ use of an aircraft environment, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Specifically, aspects of the disclosure can be applicable to power distribution systems having a limited supply power source or a limited power source. As used herein, a "limited power source" can include any power source that is limited in supplying an amount or quantity of power over a period of time by way of, for example, a discharge cycle of operation. Limited power sources can include, but are not limited to, fuel cell systems, hydrogen cell systems, capacitors, super capacitors, battery systems, rechargeable systems, banks of any of the preceding examples, or combinations thereof. In another non-limiting example, a limited power source can include a power source that can be depleted, yet inconvenient or impractical to recharge or replenish (e.g. no active replenishing power source, or only intermittent replenishing power sources are available). In another non-limiting example, "limited power sources" can further be limited by a timing aspect associated with an energy supplying cycle of operation. For example, batteries may have a limited effective discharge timing cycle until a potential voltage drops below a threshold value, while in another example, solar or photovoltaic cells can only generate power during limited times of a solar cycle. In this sense, limited power sources can include wind-generated energy, photonic energy sources, or the like, that have a limited effective power generation period or cycle. In yet another non-limiting example, "limited power sources" can include a combination of time-limited sources in combination with discharge-limited sources (e.g. solar power utilized to charge a battery bank that is discharged during night).

In contrast to "limited power sources," "constant power sources" or "unlimited power sources" can include power sources that are capable or configured to generate a predicted or predetermined quantity of power during expected operation of the power distribution system. In one non-limiting example, a constant power source can include a generator system that generates power in response to kinetic motion of a combustion engine, or a connection to a continuous power source such as a ground based power utility. Thus, as used herein, a constant power source is not limited by a discharge cycle.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations or circuit characteristics.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Also as used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Aspects of the disclosure can be implemented in any electrical circuit environment having a switch. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads via at least one solid state switch, such as a solid state switching element or a solid state power controller (SSPC) switching device. One non-limiting example of the solid state switching element or SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

The exemplary drawings are for purposes of illustration only and the dimensions, positions, order and relative sizes reflected in the drawings attached hereto can vary.

Figure 1:
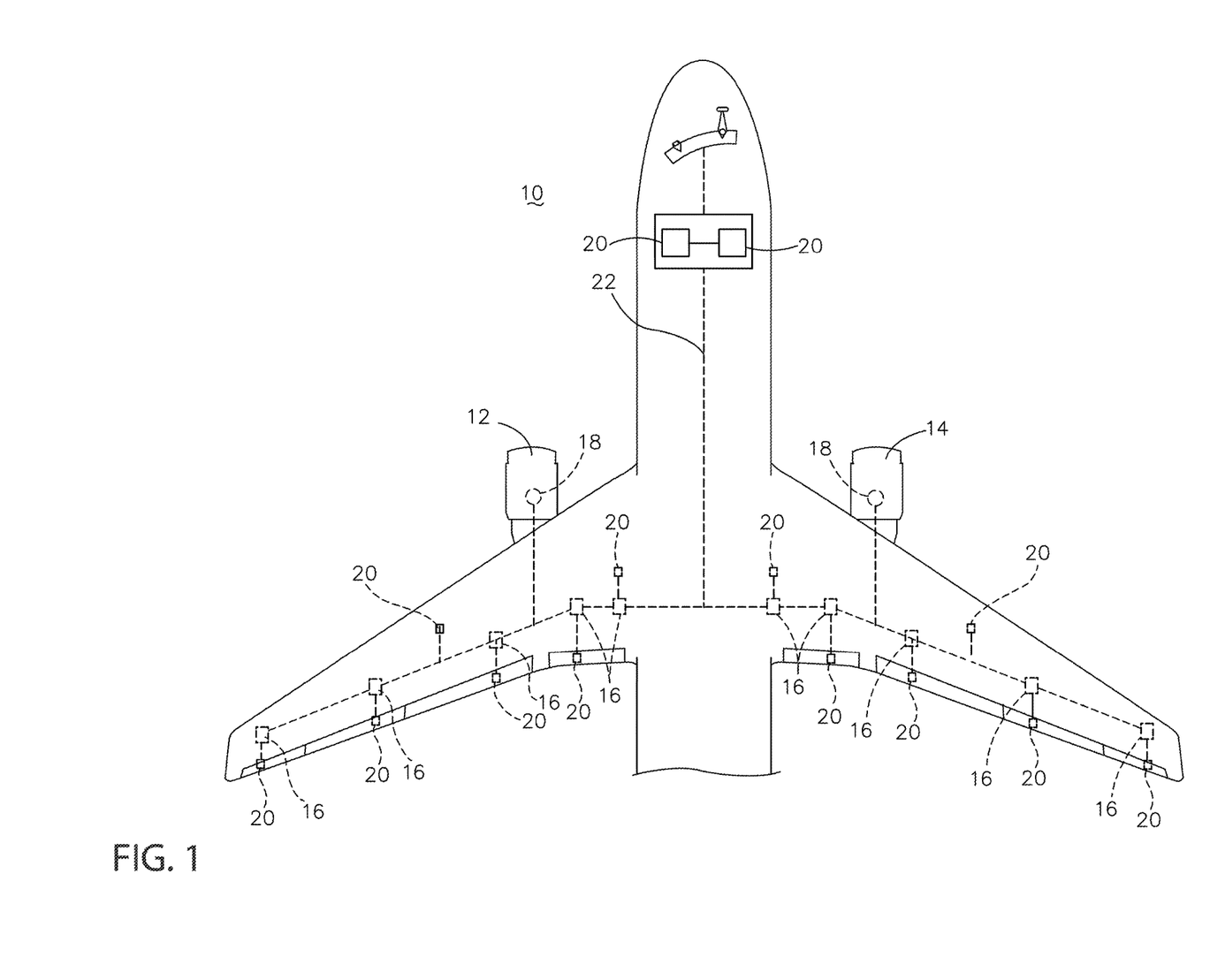
FIG. 1 is a top down schematic view of the aircraft and power distribution system in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as a first electric machine or a generator 18. The aircraft is shown further having a set of power-consuming components, or electrical loads 20, such as for instance, an actuator load, flight critical loads, and non-flight critical loads. In non-limiting examples, either the left engine system 12 or the right engine systems 12 can include additional or alternative power sources, including but not limited to a second electric machine or generator (not shown). Non-limiting aspects of the disclosure can be included wherein, for example, the first generator 18 is a primary power source and the second generator is a secondary, back-up, or redundant power source. In further non-limiting aspects of the disclosure, additional power sources can be included, such as limited power sources. In this example, the limited power source can be located anywhere on the aircraft, and are not limited to the engines 12, 14.

The electrical loads 20 are electrically coupled with at least one of the power sources, such as the generators 18, via a power distribution system including, for instance, power transmission lines 22 or bus bars, and power distribution nodes 16. It will be understood that the illustrated aspect of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the set of generators 18. The set of generators 18, in turn, generate power, such as AC or DC power, and provides the generated power to the transmission lines 22, which delivers the power to the electrical loads 20, positioned throughout the aircraft 10. Limited power sources can further be connected with the power distribution nodes 16, electrical loads 20, or the like, and can be distributed proximate to the power distribution nodes 16, or centralized in larger power source units.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, generators, auxiliary power units (APUs), batteries, or the like, can be included, and can substitute for the power source.

It will be understood that while aspects of the disclosure are shown in an aircraft environment of FIG. 1, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
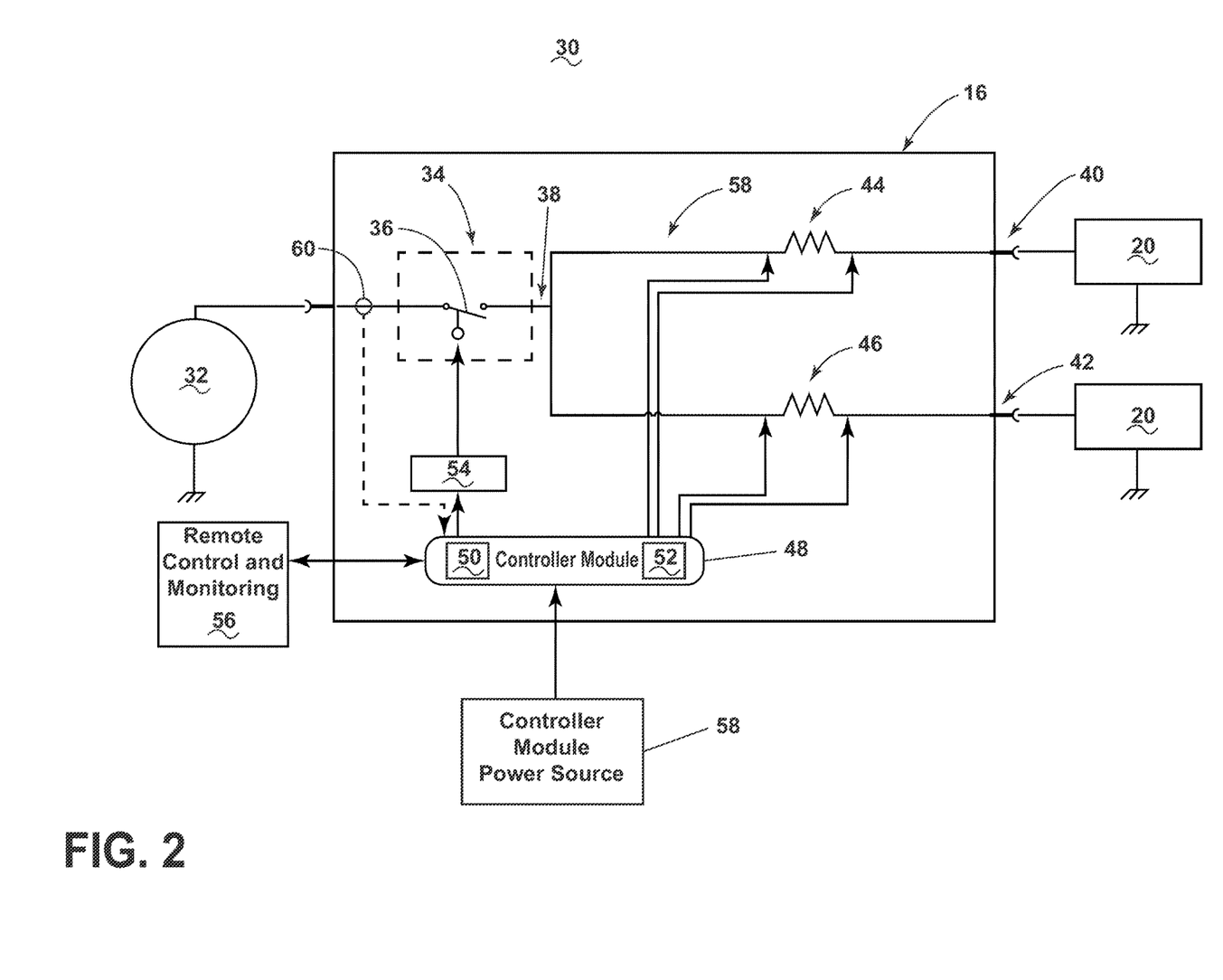
FIG. 2 is an example schematic view of the power distribution node of FIG. 1, in accordance with various aspects described herein.

FIG. 2 illustrates one non-limiting example of a power distribution system 30, schematically shown including a power source 32, a power distribution node 16, and at least one electrical load 20. In one non-limiting example, the power source 32 can include, but is not limited to, the generators 18 of FIG. 1. The power distribution node 16 can include a set of switchable elements 34, such as portions of a SSPC, solid state switch, or similar switching mechanisms for ease of understanding. The set of switchable elements 34 further having a power switch 36 adapted to operably connect or disconnect a correspondingly associated set of electrical loads 20 with the power source 32. As shown, the set of switchable elements 34 can include a power output 38, which is connected in parallel by conductors 58 to a first power distribution node output 40 and a second power distribution node output 42. The conductors 58 are shown further including a first sense resistor 44 associated with the first power distribution node output 40 and a second sense resistor 46 associated with the second power distribution node output 42. As described herein, the first and second sense resistors 44, 46 are "associated" with the respective power distribution node output 40, 42 in the sense that they are adapted, arranged, configured, or the like, to sense a power characteristic of power supplied to each respective output 40, 42.

In one non-limiting example, an amount or quantity of power demanded from a respective fault-free load, such as the electrical loads 20, must be low enough to permit a resistor, such as the sense resistors 44, 46, to be inserted in-line into the conductive pathway connecting the power output 38 with the respective power distribution node output 40, 42. In this sense, the sense resistors 44, 46 can include a resistance value that is both large enough to provide effective over-current protection in event the power output 40, 42 is short circuited, and low enough to provide adequate power quality (e.g. high enough output voltage after sense resistor 44, 46 voltage drop) to the fault-free electrical load 20 to enable the load 20 to achieve its intended or designed function.

The power distribution node 16 further includes a controller module 48 having a processor 50 and memory 52, a latch component 54, and at least one power sensor, such as a current sensor 60 associated with power supplied to the power distribution node 16 by the power supply 32. The latch component 54 can be communicatively connected with the controller module 48 and adapted to be operable in response to instruction received by the controller module 48. The latch component 54 can be further connected with a control input of the set of switchable elements 34 or the power switch 36, such that the power switch 36 is controllably operated to open or close in response to a latch component 54 output.

As used herein, the latch component 54 can include or define a circuit that has two stable states and can be used to retain either of the stable states, for example, as an output value. In this sense, a latch component 54 can be "latched" to a first binary state (e.g. a "high" logic value, for example), or can be "reset" to a second binary state (e.g. a "low" logic value). Non-limiting examples of latch components 54 can include, but are not limited to flip-flop circuits. Aspects of the disclosure can be included wherein the stable states of the latch components 54 can be retained without requiring or necessitating relatively large amounts of electrical power. For example, in one instance, a non-limiting latch component can use less than 10 microamps of power while latching a binary state (e.g. 33 microwatts of power at 3.3 Volts).

The controller module 48 is further communicatively connected with the at least one power sensor, such as the current sensor 60 to receive a sensed or measured current value. The controller module 48 can further be connected with, and adapted to measure a voltage across, the first sense resistor 44, the second sense resistor 46, or a combination thereof. In this sense, the controller module 48 can determine a sensed or measured voltage across the across the first sense resistor 44, the second sense resistor 46, or a combination thereof, or can be communicatively connected with a voltage sensor (not shown) adapted to sense or measure the same.

The controller module 48 can further be communicatively connected with a remote control and monitoring system 56 operably configured to determine, command, or otherwise influence the controllable energizing of the set of electrical loads 20 by way of the set of switchable elements 34 or power distribution node 16, for example, by way of a determined or desired power switch 36 operating condition. The controller module 48 can further be energized or operably powered by way of a controller module power source 58. Non-limiting aspects of the controller module power source 58 can include a limited power source, as explained herein.

Non-limiting examples of the power distribution system 30 can be included wherein the energizing or operably powering of the controller module 48, or the comparable energizing or operably powering of the controller module 48 to directly control the power switch 36, utilizes substantially more power, compared with the latching the power switch 36 by the latch component 54. Stated another way, operating the power switch 36 by way of the latch component 54 uses significantly less energy, power, power consumption, or the like, compared with the controller module 48 operating the power switch 36 directly (for example, consuming approximately 100 milliwatts of power). Thus, when the controller module power source 58 is a limited power source, the utilization of the latch component 54 in aspects of the disclosure can reduce the discharge cycle of the controller module power source 58 to limited periods of time when the controller module 48 operations are necessary or utilized. During non-necessary or non-utilized periods of time, the controller module 48 can enter a "sleep" or "low power consumption" operation, significantly reducing or eliminating the discharge cycle of the controller module power source 58. In one non-limiting example, the ratio of power consumption of the controller module 48 "awake" or "high power consumption" operation to "sleep" or "low power consumption" operation can be 7:1, 50:1, or greater. Thus, aspects of the disclosure can be included wherein the controller module 48 can significantly reduce power consumption of the limited power source, while still utilizing the latch component 54 effectively continues operation of the power distribution node 16 or the set of switchable elements 34.

In one non-limiting example, the power source 32 can be a limited power source, a constant power source, or a combination thereof. In another non-limiting example, the power source 32 and the controller module power source 58 can be the same limited power source, or a combination of a limited and constant power sources.

During operation of the power distribution system 30, either the remote control and monitoring system 56 or the controller module 48 can be operably charged with, or be responsible for, decisioning activities for when to energize or de-energize the set of electrical loads 20, while the controller module 48 can be operably tasked with effecting the output or control aspects of those decisioning activities. Additionally, while the decision to energize the set of electrical loads 20 can be determined by, for example either the remote control and monitoring system 56 or the controller module 48, aspects of the disclosure can be included wherein the controller module 48 can operably or effectively overrule or interrupt the energizing of the set of electrical loads 20, in contrast with the determined decision, for example, in response to another consideration, such as electrical faults, circuit safety considerations, or the like.

In the illustrated example configuration, the single power switch 36 or set of switchable elements 34 can operably control the energizing of the set of electrical loads 20 (for example, as a collective or unified group), based on a determined decision by the remote control and monitoring system 56 or the controller module 48. Additional examples can be included wherein a set of power switches 36 or a set of switchable elements 34 can independently control the energizing of a set of electrical loads 20, based on a set of determined decisions by the remote control and monitoring system 56 or the controller module 48. In this sense, the controller module 48, in response to the determined decision, can operate the latch component 54 to effect the decision. For example, a decision to energize the electrical loads 20 can be operably effected by way of controllably latching the latch component 54 to a high logic state, which further operably closes the power switch 36, supplying power from the power source 32 to the outputs 40, 42 of the power distribution node 16, and further to the set of electrical loads 20. Once the set of electrical loads 20 are energized, or in response to the latching of the power switch 36 by the latching component 54, the controller module 48 can enter the sleep or low power consumption state to reduce the discharge cycle of the controller module power source 58.

The controller module 48 can further "awaken" from the sleep state at a later time. In one non-limiting example, the remote control and monitoring system 56 can "wake" the controller module 48 by way of sending a specialized wake signal, pattern, instruction, input, interrupt, or the like, which commands or otherwise controls the controller module 48 to re-enter an "active" (i.e. non-sleep or non-low power consumption) state of operation. The wake signal can be followed by further commands, instructions, or the like, to effect a toggle of the energization of the set of electrical loads 20. In another example, the wake signal can be followed by commands to confirm or reconfirm the energization of the set of electrical loads 20. In this sense, the controller module 48 can be awoken to instruct the latch component 54 to latch the power switch 36 closed from an opened state, to latch the power switch 36 open from a closed state, or to reconfirm the power switch 36 is latched in a respective opened or closed state since the last instruction received from the remote control and monitoring system 56 or controller module 48 command.

In yet another non-limiting example, the controller module 48 can later "awaken" from the sleep state at a predetermined interval, or during a set of predetermined intervals. For instance, after being in the sleep state for a predetermined period of time, the controller module 48 can be configured to wake in order to perform a limited number of operations, prior to re-entering the sleep state. In one example, the limited number of operations can include sensing or measuring a power characteristic of or at the at least one power sensor. Sensing or measuring the power characteristic can include, but is not limited to, sensing a current value by way of the current sensor 60, sensing a voltage across the first sense resistor 44, sensing a voltage across the second sense resistor 46, or a combination thereof. The controller module 48 can further be configured to, in response to sensing or measuring the set of power characteristics, compare the sensed power characteristics with a corresponding set of threshold power values to ensure the power distribution node 16 is operating as expected. In this sense, based on or in response to the comparison of the sensed power characteristic with the corresponding set of threshold power values, a desired power switch 36 operating condition can be determined and effected, even when the desired power switch 36 operating condition is to confirm or reconfirm the desired latch component 54 operation. In another non-limiting example, the controller module 48 can perform the limited number of operations in response to being "awoken" by a remote system, such as the remote control and monitoring system 56, as explained herein.

If one or more of the set of sensed power characteristics exceeds the corresponding threshold power value or power value range, the controller module 48 can, for example, based on or in response to the comparison of the sensed power characteristic with the corresponding set of threshold power values, determine a desired power switch 36 operating condition, and effect the determined desired power switch 36 operating condition by way of operably control the latching the latch component 54 to open the power switch 36, disconnecting power from the power source 32 to the outputs 40, 42 of the power distribution node 16, and further to the set of electrical loads 20. Non-limiting examples of exceeding the corresponding threshold power value or power value range can include values indicative of overcurrent (e.g. current "trip") values, or values indicative of an electrical fault in the power distribution system 30. The controller module 48 can then re-enter the sleep mode.

If none of the set of sensed power characteristics exceeds the corresponding threshold power value or power value range (e.g. the power distribution node 16 is operating as expected), the controller module 48 can then re-enter the sleep mode. In this sense, the controller module 48 can periodically and temporarily wake from the sleep mode to query the set of power sensors, and return to sleep mode, limiting the power consumption during active operations of the controller module 48 and limiting the discharge of power from the controller module power source 58.

In another non-limiting example, the controller module 48 can awaken from the sleep state in response to a particular sense or measured signal. For instance, the set of power sensors can be adapted or configured to continuously or periodically sense or measure the respective power characteristic, and provide the sensed or measured value to the controller module 48 regardless of the sleep or active state of the controller module 48. During sleep state of the controller module 48, the controller module 48 can be configured or adapted such that receiving a sensed or measured value exceeding a predetermined threshold power value or value range can cause the controller module 48 to awaken from the sleep state. In one non-limiting example, receiving a sensed or measured value exceeding a predetermined threshold power value or value range can cause or trigger a logic interrupt response in the controller module 48. The controller module 48, after entering the active state, can respond, as needed, based on the respective sensed or measured power characteristics, as explained herein. In yet another non-limiting example, the sensed or measured value can be provided to the controller module 48, which ignores the sensed or measured value while in the sleep state.

Figure 3:
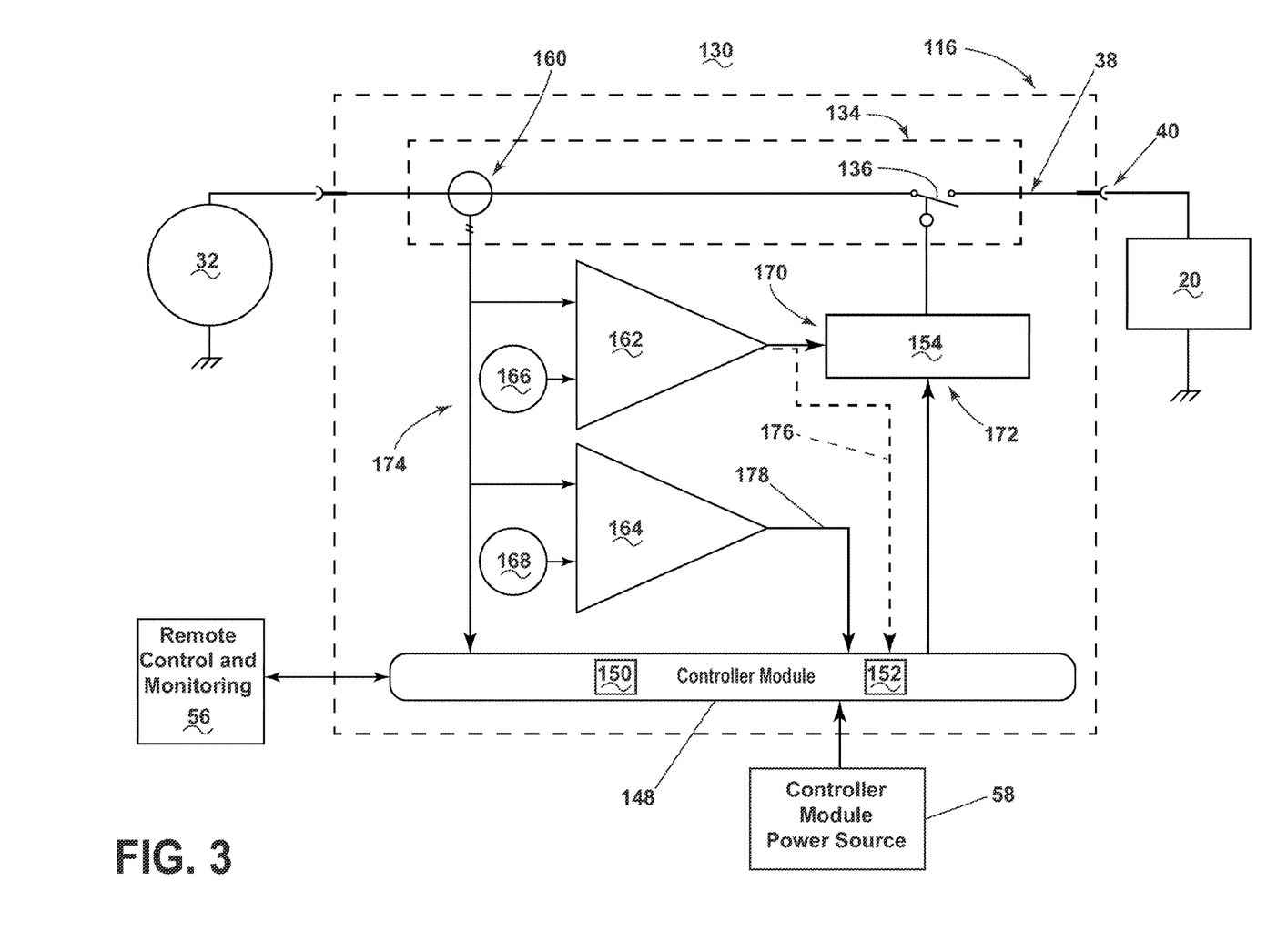
FIG. 3 is another example schematic view of the power distribution node of FIG. 1, in accordance with various aspects described herein.

FIG. 3 illustrates another power distribution system 130 having another power distribution node 116. The power distribution system 130 is similar to the power distribution system 30; therefore, like parts will be identified with like numerals increased by 100, with it being understood that the description of the like parts of the power distribution system 30 applies to the power distribution system 130, unless otherwise noted. The power distribution system 130 differs from the power distribution system 30 in the control schema and corresponding circuits of effecting operation of the power distribution node 116 or set of switchable elements 134.

As shown, a control circuit 174 can include a first comparator 162 and a second comparator 164. The first comparator 162 can receive a first input from the current sensor 160 (e.g. a sensed or measured current value) and a second input, shown as a current trip reference value 166 indicative of, or representing, a current trip value. In a first non-limiting example, the first comparator 162 can provide a compared output to the latch 154 at a reset input 170. In another non-limiting example, the first comparator 162 can alternatively, or additionally, provide the compared output to the controller module 148, by the way of communication line 176. The controller module 148 can provide a signal input to the latch component 154 at a latch set input 172.

As used herein, a current trip value represents a threshold value or range denoting an over-current condition, whereby control of the power distribution node 116 or set of switchable elements 134 would be ceased or affected in order to prevent damage or error conditions of the power distribution system 130 or to prevent damage of the conductive wiring connecting the electrical load 20. The first comparator 162 output can include, for example, a binary output indicative of whether the current sensor 160 value is greater than or less that the current trip reference value 166. In the event the current sensor 160 value is greater than the current trip reference value 166, indicating excessive current (i.e. trip current) traversing the set of switchable elements 134, the first comparator 162 output can be received by the latch component 154, for example by way of the reset input 170 and the latch component 154 can control the power switch 136 to open and cease energizing the electrical load 20. Alternatively, or in addition to the example described herein, in the event the current sensor 160 value is greater than the current trip reference value 166, indicating excessive current, the first comparator 162 output can be received by the controller module 148 by way of communication line 176. The controller module 148 can then controllably disable or prevent current carrying operations by the set of switchable elements 134 by way of operating the latching element 154, the power switch 136, the set of switchable elements 134, the power distribution node 130, or a combination thereof, for example, by way of providing a signal to the latch set input 172.

The second comparator 164 can also receive a first input from the current sensor 160 and a second input in the form of a extended current value 168 representative of a current value, which, while less than the current trip reference value 166, would still result in damage if continued for an "extended" or appreciable amount of time, to the power switch 136, the set of switchable elements 134, the power distribution node 130, the conductive wiring, or a combination thereof. The second comparator 164 can provide a compared output to the controller module 148 by way of communication line 178. As used herein, the satisfaction of a comparison between the current sensor 160 sensed or measured current values with the extended current value 168 generates a "wake" command at the second comparator 164, which is communicated to the controller module 148 by way of communication line 178. As explained herein, the controller module 148 can be configured, adapted, or the like, to awaken from a sleep or low power consumption state in response to the wake command on communication line 178. While not shown, aspects of the disclosure can be included wherein the output of the second comparator 164 can be directly provided to the latching element 154, and can controllably disable or prevent current carrying operations by the set of switchable elements 134 by way of operating the latching element 154, the power switch 136, the set of switchable elements 134, the power distribution node 130, or a combination thereof Thus, non-limiting aspects of the disclosure can be included wherein both overcurrent protections can be enabled, in addition to specialized wake commands being delivered to the controller module 148 to wake only when desired. Additionally, while not shown, aspects of the power distribution node 16 of FIG. 2, such as the set of sense resistors 44, 46 can be included in the power distribution node 116 of FIG. 3, ensuring the power distribution node 16 is operating as expected, as described herein.

Figure 4:
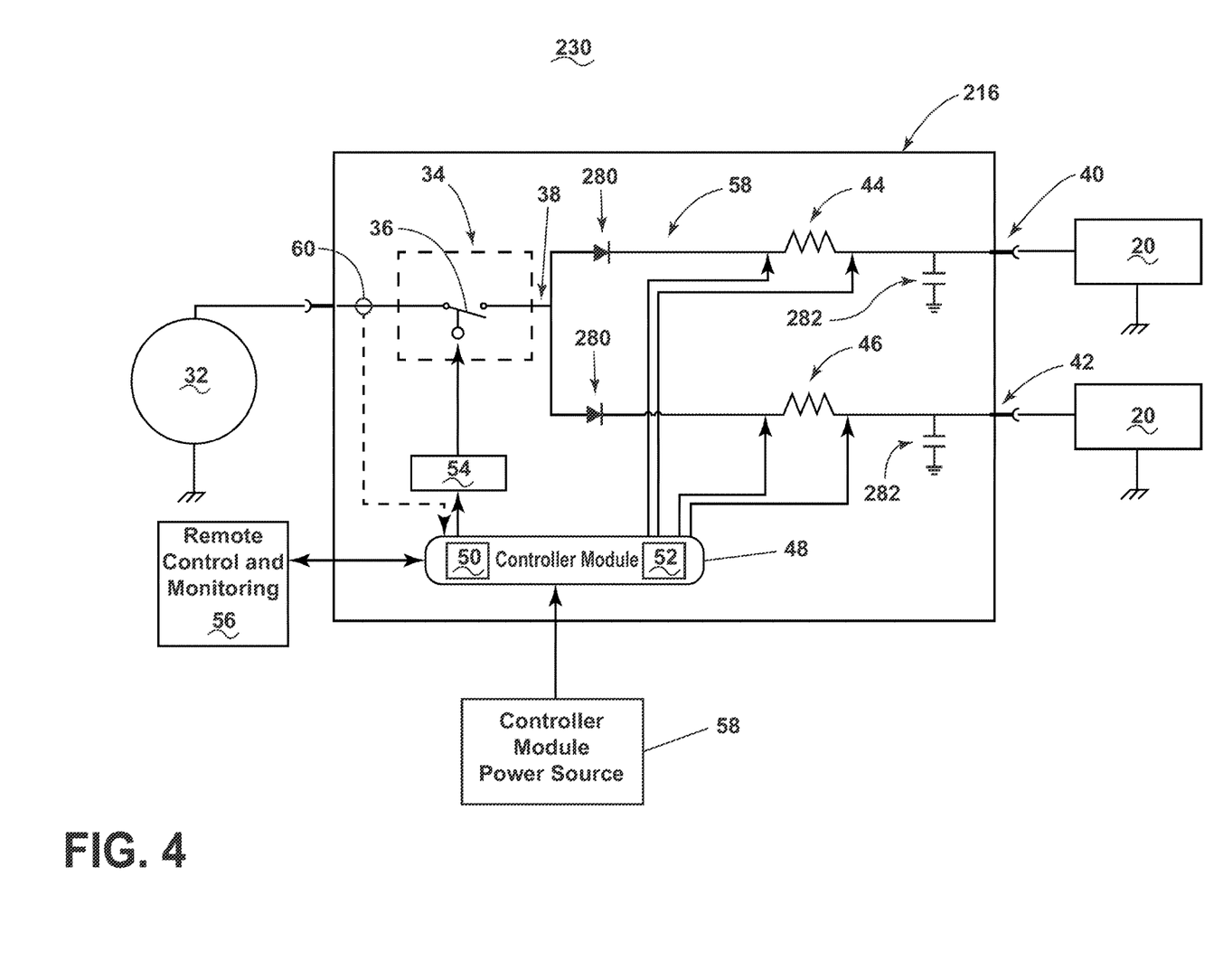
FIG. 4 is another example schematic view of the power distribution node of FIG. 1, in accordance with various aspects described herein.

FIG. 4 illustrates another power distribution system 230 having another power distribution node 216. The power distribution system 230 is similar to the power distribution system 30 of FIG. 2; therefore, like parts will be identified with like numerals increased by 200, with it being understood that the description of the like parts of the power distribution system 30 applies to the power distribution system 230, unless otherwise noted. The power distribution system 230 differs from the power distribution system 30 in the control schema and corresponding circuits of effecting operation of the power distribution node 116 or set of switchable elements 134.

As shown, optional capacitors 282 can be arranged downstream of one or each of the respective first sense resistor 44 or second sense resistor 46. Additionally, or alternatively, optional diodes 280 can be arranged upstream of one or each of the respective first sense resistor 44 or second sense resistor 46. In this sense, the capacitors 282 can provide a short-term voltage source to maintain the voltage output for a brief period of time. Furthermore, the optional diodes 280 can operably reduce the risk of regenerative feedback between the parallel power distribution node outputs 40, 42.

Non-limiting aspects of the disclosure allow for or enable the advantages of power distribution systems 30, 130 or set of switchable elements 34, 134 to be utilized by way of low power consumption modes for continuous usage from a time-limited power source. The technical effect is that the above described aspects enable the continuous operation of a power distribution node for a longer period of time without depleting, or by depleting less, of a power or time-limited power source powering or energizing the controllable operation to the power distribution node.

Solid State switching elements are becoming the preferred approach for electrical power distribution and protection, particularly in weight and volume sensitive applications such as aircraft, since they offer many advantages over fuses and electro-mechanical power protection devices such as circuit breakers, including tightly controlled protection characteristics, power monitoring and remote control. However, unlike fuses and most circuit breakers, the conventional approach of using a computing engine or controller module to provide the protection, monitoring and control functionality includes a continual power demand during operation. When considering supplying a significant number of power distribution nodes or sets of switchable elements in a large power distribution system for long periods of time from a battery, including but not limited to an aircraft power distribution system, the power demand for the conventional approach grows significantly.

One advantage that can be realized in the above aspects is that the above described aspects allows for or enables such power distribution nodes or sets of switchable elements to be considered for replacement of traditional fuse and circuit breakers which have the highly desirable capability of allowing a circuit to be powered without actually consuming any power themselves when the electrical load demand is zero (e.g. when the electrical load is unpowered). Furthermore, it enables or allows such power distribution nodes or sets of switchable elements to be considered for high voltage direct current (DC) circuits (e.g. 270 VDC or greater) that require a very low switchable element power drain. These high voltage DC circuits are not conveniently served by circuit breakers due to the difficulty of breaking a DC arc.

Yet another advantage of aspects of the disclosure can include an overall lower power consumption power distribution node or switchable element assembly, while still allowing for or enabling overcurrent protections and the like, as described herein. Lower power consumption improves overall power system electrical consumption, or lower thermal dissipation demands, allowing a more efficient system. Reduced power consumption and operating a more efficient system are desirable in power distribution systems having limited power generation, power storage, or the like.

The sequences described are for illustrative purposes only and is not meant to limit aspects of the disclosure in any way as it is understood that the portions of the disclosure can proceed in a different logical order, additional or intervening portions can be included, or described portions of the disclosure (or methods of operating the same) can be divided into multiple portions, or described portions can be omitted without detracting from the described disclosure.

Many other possible aspects, configurations, or the like, in addition to that shown in the above figures are contemplated by the present disclosure. Additionally, the design and placement of the various components can be rearranged such that a number of different in-line configurations could be realized.

The aspects disclosed herein provide an apparatus and method for controlling, or the like, a power distribution node having a set of power switches. The technical effect is that the above described aspects enable the control, operation, switchable aspects, or the like, of a power distribution node having a set of power switches.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A method of operating a power switch in a power distribution node controllably operated by a controller module, the method including, while a latch component has latched a control output to the power switch, operably enter a low power consumption mode for the controller module, receive, by the controller module in the low power consumption mode, a power characteristic of the power distribution node, compare the power characteristic with a threshold power characteristic value, and upon satisfying the comparison, operably enter a normal power consumption mode for the controller module, the normal power consumption mode consuming more power compared with the low power consumption mode, determine a desired power switch operating condition, by the controller module in the normal power consumption mode, in response to the power characteristic, and effect the determined desired power switch operating condition by way of controllably instructing the latch component to latch the control output in accordance with the determined desired power switch operating condition, and operably re-enter the low power consumption mode for the controller module.

The method of any preceding clause wherein the controller module is energized by a limited supply power source.

The method of any preceding clause wherein the limited supply power source is a dischargeable power source.

The method of any preceding clause wherein the power characteristic of the power distribution node is at least one of a voltage value or a current value.

The method of any preceding clause wherein satisfying the comparison is indicative of the voltage value exceeding a threshold voltage value.

The method of any preceding clause, further comprising operably enter the normal power consumption mode for the controller module prior to receiving the power characteristic, comparing the power characteristic with a threshold power characteristic value, and upon failure to satisfy the comparison, operably re-enter a low power consumption mode for the controller module.

The method of any preceding clause wherein operably entering the normal power consumption mode for receiving the power characteristic value occurs at a set of predetermined intervals.

The method of any preceding clause wherein operably entering the normal power consumption mode for receiving the power characteristic value is based on receiving an encoded instruction received at a power sensor configured to sense the power characteristic.

The method of any preceding clause further comprising encoding the instruction configured to operably enter the normal power consumption mode for the controller module upstream of the power distribution node, and delivering the encoded instruction to the power distribution node by way of a power conductor.

The method of claim 1, further comprising receiving in a control circuit configured for comparing the power characteristic with a threshold power characteristic value, and upon satisfying the comparison, operably instructing the power switch to open to cease a flow of power.

The method of any preceding clause, wherein the control circuit is further configured for comparing the power characteristic with a predetermined encoded instruction, and upon satisfying the comparison of the power characteristic with the predetermined encoded instruction, controllably operate the controller module to enter the normal power consumption mode.

A power distribution node, including a power switch controllably operable to supply energy from an input to an output when the power switch is closed and to not supply energy from the input to the output when the power switch is open, a latch component controllably operable to latch a binary control output connected with the power switch, and operable to controllably close and open the power switch, a controller module adapted to operate in a normal power consumption mode and a low power consumption mode, the normal power consumption mode consuming more power than the low power consumption mode, and configured to controllably operate the latch component to latch the binary control output in the normal power consumption mode, a limited supply power source connected with and energizing the controller module, and a control circuit configured to sense a power characteristic of the power distribution node, and upon satisfying a comparison of the power characteristic with a power characteristic threshold, instruct the controller module to enter the normal power consumption mode from the low power consumption mode, wherein, when in a normal power consumption mode, the controller module is further configured to re-enter the low power consumption mode after controllably operating the latch component to latch the binary control output.

The power distribution node of any preceding clause wherein the limited supply power source is a dischargeable power source.

The power distribution node of any preceding clause wherein the power characteristic threshold is representative of at least one of an overcurrent condition of the power distribution node or an electrical fault of the power distribution node.

The power distribution node of any preceding clause wherein the controller module is further configured to enter a normal power consumption mode from a low power consumption mode at a set of predetermined intervals.

The power distribution node of any preceding clause wherein the control circuit is further configured to compare the power characteristic with a predetermined wake code, and upon satisfaction of the comparison, instruct the controller module to enter the normal power consumption mode from the low power consumption mode.

The power distribution node of any preceding clause wherein, upon satisfying the comparison of the power characteristic with the power characteristic threshold, the control circuit is configured to operably reset the latch component to controllably open the power switch.

The power distribution node of any preceding clause wherein the latch component is configured to ensure the binary control output is held latched until reset.

The power distribution node of any preceding clause, further comprising a set of power switches operably connected with a respective set of power distribution node outputs and a corresponding set of latch components operably connected with the set of power switches.

The power distribution node of any preceding clause wherein the control circuit is configured to sense a power characteristic associated with each respective power distribution node output, and wherein the controller module is configured to independently operate the set of latch components.

What is claimed is:

1. A method of operating a power switch having an input and an output in a power distribution node controllably operated by a controller module, the method comprising:
   coupling the input of the power switch to a limited supply power source;
   coupling the output of the power switch to a load;
   coupling a capacitor between the output of the power switch and an electrical ground;
   coupling a diode electrically in series between an output of the power switch and the output of the power distribution node;
   while a latch component has latched a control output to the power switch, entering a low power consumption mode for the controller module;
   receiving, by the controller module in the low power consumption mode, a power characteristic of the power distribution node;
   comparing the power characteristic with a threshold power characteristic value, and upon satisfying the comparison, operably enter a normal power consumption mode for the controller module, the normal power consumption mode consuming more power compared with the low power consumption mode;
   determining a desired power switch operating condition, by the controller module in the normal power consumption mode, in response to the power characteristic, and effect the determined desired power switch operating condition by way of controllably instructing the latch component to latch the control output in accordance with the desired determined power switch operating condition; and
   re-entering the low power consumption mode for the controller module.

2. The method of claim 1 wherein the limited supply power source is a dischargeable power source.

3. The method of claim 1 wherein the power characteristic of the power distribution node is at least one of a voltage value or a current value.

4. The method of claim 3 wherein satisfying the comparison is indicative of the voltage value exceeding a threshold voltage value.

5. The method of claim 1, further comprising operably entering the normal power consumption mode for the controller module prior to receiving the power characteristic, comparing the power characteristic with a threshold power characteristic value, and upon failure to satisfy the comparison, operably re-entering a low power consumption mode for the controller module.

6. The method of claim 5 wherein operably entering the normal power consumption mode for receiving the power characteristic occurs at a set of predetermined intervals.

7. The method of claim 5 wherein operably entering the normal power consumption mode for receiving the power characteristic is based on receiving an encoded instruction received at a power sensor configured to sense the power characteristic.

8. The method of claim 7 further comprising encoding the instruction configured to operably enter the normal power consumption mode for the controller module upstream of the power distribution node, and delivering the encoded instruction to the power distribution node by way of a power conductor.

9. The method of claim 1, further comprising receiving in a control circuit configured for comparing the power characteristic with a threshold power characteristic value, and upon satisfying the comparison, operably instructing the power switch to open to cease a flow of power.

10. The method of claim 9, further comprising comparing, by the control circuit, the power characteristic with a predetermined encoded instruction, and upon satisfying the comparison of the power characteristic with the predetermined encoded instruction, controllably operating the controller module to enter the normal power consumption mode.

11. A power distribution node, comprising:
   a power switch controllably operable to supply energy from an input to an output when the power switch is closed and to not supply energy from the input to the output when the power switch is open;
   a capacitor coupled between the output of the power switch and electrical ground;
   a diode electrically in series between the power switch output and an output of the power distribution node;
   a latch component controllably operable to latch a binary control output connected with the power switch, and operable to controllably close and open the power switch;
   a controller module adapted to operate in a normal power consumption mode and a low power consumption mode, the normal power consumption mode consuming more power than the low power consumption mode, and configured to controllably operate the latch component to latch the binary control output in the normal power consumption mode;
   a limited supply power source connected with and energizing the controller module; and
   a control circuit configured to sense a power characteristic of the power distribution node, and upon satisfying a comparison of the power characteristic with a power characteristic threshold, instruct the controller module to enter the normal power consumption mode from the low power consumption mode;
   wherein, when in a normal power consumption mode, the controller module is further configured to re-enter the low power consumption mode after controllably operating the latch component to latch the binary control output.

12. The power distribution node of claim 11 wherein the limited supply power source is a dischargeable power source.

13. The power distribution node of claim 11 wherein the power characteristic threshold is representative of at least one of an overcurrent condition of the power distribution node or an electrical fault of the power distribution node.

14. The power distribution node of claim 11 wherein the controller module is further configured to enter a normal power consumption mode from a low power consumption mode at a set of predetermined intervals.

15. The power distribution node of claim 11 wherein the control circuit is further configured to compare the power characteristic with a predetermined wake code, and upon satisfaction of the comparison, instruct the controller module to enter the normal power consumption mode from the low power consumption mode.

16. The power distribution node of claim 11 wherein, upon satisfying the comparison of the power characteristic with the power characteristic threshold, the control circuit is configured to operably reset the latch component to controllably open the power switch.

17. The power distribution node of claim 11 wherein the latch component is configured to ensure the binary control output is held latched until reset.

18. The power distribution node of claim 11, further comprising a set of power switches operably connected with a respective set of power distribution node outputs;
a corresponding set of latch components operably connected with the set of power switches; and
a set of diodes electrically coupled in series between an output of a respective power switch and the output of the power distribution node.

19. The power distribution node of claim 18 wherein the control circuit is configured to sense a power characteristic associated with each respective power distribution node output, and wherein the controller module is configured to independently operate the set of latch components.

* * * * *